UNITED STATES PATENT OFFICE.

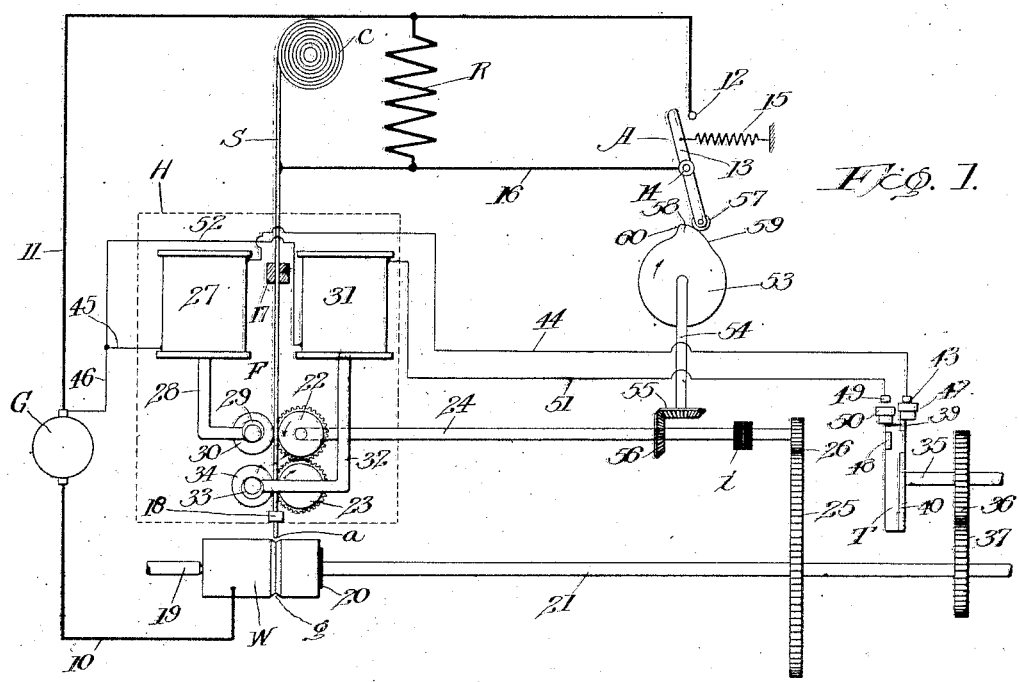

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

METHOD OF AND MEANS FOR ELECTRIC-ARC WELDING.

1,278,984.   Specification of Letters Patent.   Patented Sept. 17, 1918.

Application filed March 2, 1917, Serial No. 152,118. Renewed November 12, 1917. Serial No. 201,716.

*To all whom it may concern:*

Be it known that I, HARRY D. MORTON, a citizen of the United States, residing at Detroit, Wayne county, State of Michigan, have invented certain new and useful Improvements in Methods of and Means for Electric-Arc Welding, of which the following is a specification.

My invention relates to the art of electric arc welding and particularly to a method and means for preventing an excessive flow of current through the welding circuit when said circuit is closed upon starting the welding operation.

It is well known that in electric arc welding the source of welding current is substantially short circuited upon itself when the welding electrode is fed into contact with the work to close the circuit and draw the arc in starting the welding operation. This short circuit causes an excessive flow of current through the welding circuit and across the contact between the work and the welding electrode and will result in damage to the apparatus and work unless prevented. Heretofore, it has been the practice to temporarily insert resistance in the welding circuit by electro-magnetic means which becomes operative only when current flows in the welding circuit. It will be obvious that since current must flow through the welding circuit before the resistance-inserting means becomes operative, the dead short circuit and consequent excessive rush of current—the thing desired to be avoided—occurs before the preventing means becomes operative. Another method of preventing the rush of current through the welding circuit comprises connecting a resistance in the welding circuit so that normally and upon closing the circuit there will be resistance in series with the work and welding electrode. This resistance is later cut out by an electro-magnetically operated switch, the winding of the electro-magnet being connected in the welding circuit. This winding is wasteful of current and I have found that its action is not entirely dependable and cannot be timed with an electrode feeding mechanism.

The principal object of my invention therefore is to provide a method and means whereby the resistance of the welding circuit may be temporarily increased by inserting resistance therein by a mechanically operating means which coacts with and is timed with the electrode feeding mechanism. By thus employing a mechanical means the increase and decrease of the resistance in the welding circuit is not directly dependent on the flow of current in the welding circuit.

Another object of my invention is to so design the said mechanical means that it will become operative to insert resistance in the welding circuit before the circuit is completed and thus the means for preventing the excessive flow of current is operative before there could be an excessive flow.

A further object of my invention consists in designing the said mechanical means so that it will keep the resistance in circuit a predetermined interval of time and until after the arc is drawn between the welding electrode and the work. By inserting the resistance in circuit before completing the circuit and not cutting out the resistance until after the arc is drawn, any variations in the length of the welding electrode or strip will not permit a short circuit and consequent excessive flow of current.

The above and other objects and the novel features of my invention will be apparent from the following description taken in connection with the drawing, in which, Figure 1 is a diagram of a metallic electrode electric arc welding system embodying my invention; and Figs. 2 and 3 are perspective views of opposite sides of a timer disk by means of which the feeding mechanism is controlled.

While I have shown my invention as applied to a metallic electrode electric arc welding system in which the metallic electrode consists of a welding strip or wire continuously and automatically fed to the work during the welding operation, it is to be understood that the principle of operation of my invention is not limited to this type of electric arc welding. Referring to Fig. 1, G represents a generator or other suitable source of current for supplying suitable welding current to the welding circuit which includes the wires 10 and 11. The wire 10 is electrically connected to the work W and the wire 11 is connected to one side of a resistance R and also to a terminal 12 of an electric switch A. The switch A consists of a switch blade 13 pivoted intermediate its ends at 14 and normally held in closed position by a spring 15. The switch blade 13 is connected to a wire 16 which is electrically connected to the other terminal of the resistance R and also electrically connected to the welding strip or wire S.

The work W and the welding strip or wire S constitute the two electrodes between which the arc is drawn at $a$, the work being shown as provided with a groove $g$ at the joint between two pieces of metal, which groove is filled with welding material supplied by the strip S. The welding strip S consists of iron or other metal wire of a suitable composition automatically and uninterruptedly supplied from a coil $c$ to the work W by an automatic feeding mechanism designated generally by F.

The feeding mechanism is carried within a casing or welding head H indicated in dotted lines and the strip S is fed through suitable upper and lower guides 17 and 18 on the welding head H. While the molten metal supplied by the welding strip S is being deposited on the work W, the latter is being rotated about its axis, as the work is supported for rotation by a point 19 and a chuck 20 carried by the rotatable shaft 21. It will be understood that the welding head H remains stationary while the work W is being rotated but this condition may be reversed in some classes of work where the work W remains stationary while the welding head H is moved along the part of the work to be welded. The feeding mechanism F includes a direct feed roll 22 and a reverse feed roll 23, which have serrated faces to grip the wire and are geared together as shown. These rolls are continuously driven in opposite directions by a shaft 24 which carries the feed roll 22. The shaft 24 is continuously driven from the shaft 21 by gears 25 and 26 and an insulating coupling $i$ is interposed between parts of the shaft 24 to insulate the feed mechanism from the work. The direct feed roll 22 is brought into action to feed the welding strip S to the work by means of a direct feed control solenoid 27 mounted on the head H. The plunger 28 of this solenoid is connected to an eccentric sleeve 29 within an idler roll 30 so that when the solenoid 27 is energized it will cause the idler roll 30 to force the welding strip S toward the right in Fig. 1 and against the feed roll 22 which is rotating in the direction indicated by the arrow and will grip the strip S and feed it toward the work. The reverse feed roll 23 is rendered operative when the reverse feed solenoid 31 is energized. This solenoid is provided with a plunger 32 the end of which carries an eccentric bushing 33 on which the idler roll 34 is mounted. When the solenoid 31 is energized the idler roll 34 will force the welding strip S against the feed roll 23 rotating in the direction indicated by the arrow and the welding strip will be gripped and fed away from the work W to draw the arc to start the welding operation and to rupture the arc when the welding operation is completed.

The times at which the solenoids 27 and 31 are rendered operative and inoperative are determined by a timer disk T mounted on and driven by the driving shaft 35, which is geared to the shaft 21 by the gears 36 and 37. The construction of the timer disk T is shown in Figs. 2 and 3. Referring to Fig. 2, the body 38 of the disk has two cam members 39 and 40 thereon which are positioned so that they will operate switches to control the solenoid 27 which feeds the welding strip S toward the work. The edges of the cams 39 and 40 extend a slight distance above the face 41 of the cam and serve to open and close the switch contacts 42 and 43, which are normally open. The switch contact 43 is connected by a wire 44 to one terminal of the winding of the solenoid 27 and the other terminal of this solenoid winding is connected by the wires 45 and 46 to a suitable source of current such as the generator G. Referring to Fig. 3, the body 38 of the timer disk T has two other cam members 47 and 48 connected to it and projecting above the face 41 of the disk so as to close the switch contacts 49 and 50 at the proper instants to energize the reverse feed solenoid 31. The terminals 49 and 50 are normally open and the terminal 49 is connected by a wire 51 to one end of the winding of the solenoid 31, the other end of the winding of this solenoid winding being connected to the generator G or other suitable source of current by means of the wires 52 and 46. Shaft 18 runs somewhat slower than shaft 60, because while the work W is making one revolution to complete the weld, the timer T presents only that portion of its cam surface which keeps the re-direct or welding feed in action, the timer, in its cycle, provides time before and after the weld is completed for closing the circuit, drawing the arc, rupturing the arc, and for the removal of the finished work and insertion of new work. Consequently, the shaft 18 should rotate about 60% as fast as the shaft 60.

The operation of the switch blade 13 is controlled by a cam 53 carried by a shaft 54 and driven from the feed roll shaft 24 by the gears 55 and 56. One end of the switch blade 13 carries a roller 57 which rides on the face of the cam 53. The switch is opened when the hump 58 on the cam face engages the roller 57. The cam 53 is so positioned that the point 59 will reach the roller 57 and throw the switch 13 open before the end of the welding strip S engages the work W. The end of the welding strip S is cut off at an exact point, say at the guide 18, at the end of each welding operation and the distance which the strip is fed during the initial feeding movement to close the welding circuit is determined by the cam member 39 on the timer disk T. This cam member 39 closes the circuit of the direct feed solenoid 27 at the contacts 42, 43 and the feed roll 22 will then be rendered operative to feed the welding strip, but before the end of the welding strip reaches the work W the switch 13 will have been opened, thereby inserting the resistance R in the welding circuit in series with the welding strip S. The purpose of inserting the resistance R in the welding circuit before the welding circuit is closed will be apparent as the excessive flow of current through the welding circuit and across the contact between the strip S and the work W will thereby be avoided. The point at which the resistance R is inserted in the welding circuit can be determined to suit a particular machine by proportioning the hump 58 of the cam to locate the switch opening point 59 thereof to open the switch at any desired time prior to the completion of the welding circuit. The welding strip S will be fed toward the work while the direct feed solenoid 27 is energized and when a part connected to the movable contact 42 has traversed the length of the cam 39 the solenoid 27 will be deënergized and a movable part of the contact 50 will ride up onto the cam 48, closing the circuit of the reverse feed solenoid 31 at the contacts 49, 50, causing the end of the welding strip S to be fed away from the work W far enough to draw the arc at $a$. For a part of this period of time the roller 57 will be riding over the hump 58 to keep the switch open and the resistance R in the welding circuit until after the arc is drawn, say for 1/100 of a second after the arc is drawn. At this instant the roller 57 passes over the point 60 of the cam whereupon the switch 13 is closed by the spring 15, cutting out the resistance R and allowing the full welding current to flow through the welding circuit. Immediately after the movable contact member of the contact 50 passes over the cam 48, the movable contact of the contact member 42 moves onto the cam 40 which closes the contacts 42, 43 and energizes the direct feed solenoid 27 to cause the welding strip S to be continuously fed toward the work, the end of the welding strip being fused by the arc at $a$ and depositing the molten metal on the work continuously while the cam 40 is operating. The cam 40 is proportioned so that it will keep the direct feed roll solenoid 27 energized during the entire welding operation, which may require one or several rotations of the work W to fill the groove $g$. During the time that the re-direct cam 40 is operative for welding purposes the cam 53 will be rotating in the direction shown by the arrow but the cam is so designed that the point 59 will not again reach the roller 57 to open the switch A until after the welding operation is completed, the arc has been ruptured and the direct feed solenoid 27 again becomes operative to feed the welding strip S toward the work to close the welding circuit. After the movable part of the contact member 42 has traversed the cam 40, the solenoid 27 is deënergized and immediately thereafter the movable member of the contact 50 rides up onto the cam 47 and the reverse feed solenoid 31 is energized, causing the feed roll 23 to feed the end of the welding strip S away from the work and arc to rupture the arc. The rupture of the arc is timed to take place when the welding operation is complete and after this rupture there is an interval of time provided for by the timer disk T during which the completed work may be removed from the welding machine and a new article to be welded set in its place, after which the resistance control mechanism and feeding mechanism go through the same cycle of operation. It will thus be seen that the action of the welding machine is entirely automatic.

In the disclosure of my method I employ a cam as typical of the number of different mechanical devices whereby a switch may be mechanically operated to cause resistance to be inserted in and cut out of the welding circuit at the proper instant timed and coacting mechanically with the feeding mechanism. The cam or its equivalent is preferably arranged so that it will operate the switch to insert the resistance at a predetermined time before the welding circuit is closed between the work and the welding strip. The cam is also preferably designed so that it will keep the resistance in the welding circuit for a predetermined time and until after the arc has been drawn by the welding strip feed mechanism, but it is to be understood that the resistance may be gradually decreased or the cam may be designed so that the resistance will be cut out of the circuit at the instant that the arc drawing feed mechanism is rendered operative.

Having thus described the invention, what is claimed and desired to be secured by Letters Patent is:

1. In electric arc welding, the method of preventing an excessive flow of current across the contacts between the electrodes at starting, which comprises increasing the resistance of the welding circuit at a predetermined interval before said circuit is closed.

2. In electric arc welding in which the work constitutes one electrode, the method of controlling the current in the welding circuit to prevent an excessive flow of current across the contacts between the electrodes at starting, which consists in increasing the resistance of the welding circuit immediately before said circuit is initially closed by the engagement of the electrodes with each other, and decreasing the resistance immediately after the arc has been drawn between said electrodes.

3. In electric arc welding apparatus, the combination of a welding circuit including a source of electric current and two electrodes between which an arc is adapted to be drawn, and means whereby the resistance of said welding circuit is increased at a predetermined interval before said electrodes are initially brought into contact with each other in order to prevent an excessive rush of current across the contact between said electrodes at the moment they contact with each other.

4. In electric arc welding apparatus in which the work constitutes one of the electrodes, the combination of a welding circuit including a source of electric current and the work and another electrode between which an arc is adapted to be drawn, a resistance, mechanically operable means whereby said resistance is connected in said welding circuit to increase the resistance thereof immediately before the welding circuit is closed to avoid an excessive rush of current through the electrodes and across the contact therebetween.

5. In an electric arc welding apparatus in which the work constitutes one of the electrodes, the combination of a welding circuit including a source of electric current, and the work and another electrode between which an arc is adapted to be drawn, a resistance, means including a mechanically operable switch whereby, when the welding apparatus is started, said resistance is first inserted in said welding circuit to increase the resistance thereof at a predetermined interval before said circuit is closed to avoid an excessive rush of current in the welding circuit, and whereby said resistance is cut out of the welding circuit at a predetermined interval after the arc has been drawn to permit the use of substantially the entire current of the welding circuit for welding purposes.

6. In electric arc welding apparatus in which the work constitutes one of the electrodes, the combination of a welding circuit including a source of electric current, the work and another electrode between which an arc is adapted to be drawn, means for feeding said other electrode and work relatively to each other to close the welding circuit, and means operable independently of the current flowing in said welding circuit to increase the resistance of said circuit before it is closed, thereby avoiding an excessive rush of current through the electrodes and across the contact therebetween.

7. In a metallic electrode electric arc welding apparatus in which the work constitutes one of the electrodes and a metallic welding strip constitutes the other electrode, the combination of a welding circuit including a source of electric current, said work and said strip, means for feeding the welding strip to the work to close the welding circuit, and means timed with said feeding means to increase the resistance of the welding circuit at a predetermined instant to avoid an excessive rush of current through the electrodes and across the contact therebetween when said circuit is closed.

8. In a metallic electrode electric arc welding apparatus in which the work constitutes one of the electrodes and a metallic welding strip constitutes the other electrode, the combination of a welding circuit including a source of electric current, the work and said welding strip, means for feeding the welding strip toward and away from the work to close the welding circuit and to draw the arc, and means timed with said feeding means to increase the resistance of the welding circuit before said circuit is closed to avoid an excessive rush of current therethrough, and also timed to decrease the resistance of the welding circuit at a predetermined instant after the arc is drawn.

9. In a metallic electrode electric arc welding apparatus in which the work constitutes one of the electrodes and a metallic welding strip constitutes the other electrode, the combination of a welding head, means for moving said head and work relatively to each other, means on said head for feeding the welding strip toward and away from the work to complete the welding circuit and to draw the arc, respectively, and means timed with said feeding means to increase the resistance of the welding circuit to prevent an excessive rush of current therethrough when said welding strip is initially fed into engagement with said work.

10. In a metallic electrode electric arc welding apparatus in which the work constitutes one of the electrodes and a metallic welding strip constitutes the other electrode, the combination of a welding head, means for moving said head and work relatively to each other, means on said head for feeding the welding strip toward and away from the work to complete the welding circuit and to draw the arc, respectively, means timed with said feeding means to increase the resistance of the welding circuit to prevent an excessive rush of current therethrough when said welding strip is initially fed into engagement with said work, and means timed with said feeding means to decrease the resistance of said welding circuit after the arc has been drawn.

11. In a metallic electrode electric arc welding apparatus in which the work constitutes one of the electrodes and the metallic welding strip constitutes the other electrode, the combination of a welding head, means for moving said welding head and work relatively to each other, means for feeding the welding strip toward and away from the work to close the welding circuit and thereafter to draw the arc, a resistance, and means mechanically coacting with the feeding means to insert said resistance in the welding circuit to prevent an excessive rush of current when the welding strip contacts with the work.

12. In a metallic electrode electric arc welding apparatus in which the work constitutes one of the electrodes and the metallic welding strip constitutes the other electrode, the combination of a welding head, means for moving said welding head and work relatively to each other, means for feeding the welding strip toward and away from the work to close the welding circuit and thereafter to draw the arc, a resistance, and means mechanically coacting with the feeding means for inserting said resistance in the welding circuit before the welding circuit is closed to prevent an excessive rush of current when the welding strip contacts with the work, said mechanically coacting means being operative to remove said resistance from the welding circuit after a predetermined operation of said feeding means.

13. In a metallic electrode electric arc welding apparatus in which the work constitutes one of the electrodes and a metallic welding strip constitutes the other electrode, a welding circuit including a source of electric current and said work and welding strip between which an arc is adapted to be drawn, a welding head, means for moving said welding head and work relatively to each other, means for feeding the welding strip toward and away from the work to close the welding circuit and thereafter to draw the arc, a resistance normally connected in shunt with a part of the welding circuit, a normally closed switch in said part of the welding circuit, and means timed with the feeding means for opening said switch before the welding circuit is closed by said feeding means to insert said resistance in the welding circuit to prevent an excessive rush of current therethrough when the welding strip is fed into engagement with the work.

14. In a metallic electrode electric arc welding apparatus in which the work constitutes one of the electrodes and a metallic welding strip constitutes the other electrode, a welding circuit including a source of electric current and said work and welding strip between which an arc is adapted to be drawn, a welding head, means for moving said welding head and work relatively to each other, means for feeding the welding strip toward and away from the work to close the welding circuit and thereafter to draw the arc, a resistance normally connected in shunt with a part of the welding circuit, a normally closed switch in said part of the welding circuit, and a cam timed with the feeding means for opening said switch before the welding circuit is closed by said feeding means to insert said resistance in the welding circuit to prevent an excessive rush of current therethrough when the welding strip is fed into engagement with the work.

15. In a metallic electrode electric arc welding apparatus in which the work constitutes one of the electrodes and a metallic welding strip constitutes the other electrode, the combination of a welding circuit including a source of electric current, the work and the welding strip, a welding head, means for moving said welding head and work relatively to each other, feeding means on said welding head for automatically feeding the welding strip toward and away from the work, a resistance normally connected in shunt with a part of the welding circuit, a switch normally closing the circuit through said part of the welding circuit, a cam timed with the feeding means and having a face adapted to operate a part connected to said switch, said cam face being adapted to open said switch at a predetermined instant to insert said resistance in the welding circuit before the welding strip contacts with the work and also adapted to release said switch at a predetermined instant after the arc is drawn by said feeding means to cut the resistance out of the welding circuit.

In testimony whereof I affix my signature.

HARRY D. MORTON.